United States Patent
Du Toit et al.

(10) Patent No.: US 10,320,842 B1
(45) Date of Patent: Jun. 11, 2019

(54) SECURELY SHARING A TRANSPORT LAYER SECURITY SESSION WITH ONE OR MORE TRUSTED DEVICES

(71) Applicant: Symantec Corporation, Mountain View, CA (US)

(72) Inventors: Roelof N. Du Toit, Portersville, PA (US); Noah Z. Robbin, Ellwood, PA (US); David Wells, Cambridgeshire (GB)

(73) Assignee: SYMANTEC CORPORATION, Mountain View, CA (US)

( * ) Notice: Subject to any disclaimer, the term of this patent is extended or adjusted under 35 U.S.C. 154(b) by 231 days.

(21) Appl. No.: 15/468,895

(22) Filed: Mar. 24, 2017

(51) Int. Cl.
| | |
|---|---|
| *H04L 29/06* | (2006.01) |
| *H04L 9/08* | (2006.01) |
| *H04L 9/14* | (2006.01) |
| *H04L 9/32* | (2006.01) |
| *H04L 29/08* | (2006.01) |

(52) U.S. Cl.
CPC .......... *H04L 63/166* (2013.01); *H04L 9/0841* (2013.01); *H04L 9/0861* (2013.01); *H04L 9/14* (2013.01); *H04L 9/32* (2013.01); *H04L 63/0428* (2013.01); *H04L 63/061* (2013.01); *H04L 63/1466* (2013.01); *H04L 67/141* (2013.01); *H04L 67/146* (2013.01)

(58) Field of Classification Search
CPC .................................................... H04L 63/166
See application file for complete search history.

(56) References Cited

U.S. PATENT DOCUMENTS 6,823,454 B1 * 11/2004 Hind ................. H04L 29/12066
713/168
7,096,352 B2 * 8/2006 Kang ................. H04L 63/0428
380/270

(Continued)

FOREIGN PATENT DOCUMENTS

WO   2008022520 A1   2/2008

OTHER PUBLICATIONS

Turner; "Transport Layer Security"; Published in: IEEE Internet Computing (vol. 18 , Issue: 6 , Nov.-Dec. 2014); pp. 60-63; Date of Publication: Oct. 29, 2014; IEEE Xplore (Year: 2014).*

(Continued)

*Primary Examiner* — Bradley W Holder
(74) *Attorney, Agent, or Firm* — Maschoff Brennan (57) ABSTRACT

Securely sharing a Transport Layer Security (TLS) session with one or more trusted devices. In one embodiment, a method may include establishing a TLS session between a client device and a server device, communicating encrypted messages that are encrypted using encryption keys between the client device and the server device, and intercepting and decrypting one or more of the encrypted messages at a trusted device using the encryption keys. In this embodiment, the establishing of the TLS session may include negotiating a master secret, establishing a secure channel between the trusted device and the client device or the server device, sending, from the client device or the server device, the master secret to the trusted device over the secure channel, and employing the master secret at the client device, at the server device, and at the trusted device to generate, for the TLS session, the encryption keys.

13 Claims, 4 Drawing Sheets

(56) References Cited

U.S. PATENT DOCUMENTS

| | | | |
|---|---|---|---|
| 7,900,039 B2* | 3/2011 | Shim | H04L 63/166 380/272 |
| 8,000,344 B1* | 8/2011 | Frick | H04L 63/162 370/395.53 |
| 8,209,532 B2 | 6/2012 | Liu | |
| 8,392,980 B1* | 3/2013 | Ahrens | H04L 63/166 380/247 |
| 9,231,769 B1* | 1/2016 | Naidu | H04L 63/0823 |
| 10,171,463 B1* | 1/2019 | Wiger | H04L 63/04 |
| 2003/0159029 A1* | 8/2003 | Brown | G07B 17/00193 713/151 |
| 2003/0191965 A1* | 10/2003 | Yeager | H04L 29/06 713/156 |
| 2003/0226017 A1* | 12/2003 | Palekar | H04L 63/0428 713/168 |
| 2009/0025078 A1* | 1/2009 | Kuehr-Mclaren | H04L 63/166 726/14 |
| 2009/0271612 A1 | 10/2009 | Liu | |
| 2010/0058060 A1* | 3/2010 | Schneider | H04L 9/0844 713/171 |
| 2010/0153702 A1* | 6/2010 | Loveless | H04L 63/08 713/151 |
| 2011/0010544 A1* | 1/2011 | Inaba | H04L 9/321 713/168 |
| 2012/0042160 A1* | 2/2012 | Nakhjiri | H04L 9/0844 713/151 |
| 2013/0312054 A1* | 11/2013 | Wang | H04L 63/0236 726/1 |
| 2014/0082204 A1* | 3/2014 | Shankar | H04L 63/166 709/227 |
| 2014/0351577 A1* | 11/2014 | Vishal | H04L 9/3263 713/156 |
| 2016/0119287 A1* | 4/2016 | Khazan | H04L 63/166 726/12 |
| 2016/0127414 A1* | 5/2016 | Mazur | H04L 63/18 713/151 |
| 2016/0226827 A1* | 8/2016 | Bohannon | H04L 63/0281 |
| 2016/0359823 A1* | 12/2016 | Ayyadevara | H04L 63/061 |
| 2017/0093824 A1* | 3/2017 | Shulman | H04L 63/0281 |
| 2017/0223054 A1* | 8/2017 | Wing | H04L 63/166 |
| 2018/0020020 A1* | 1/2018 | Lee | H04L 63/0823 |

OTHER PUBLICATIONS

Gasmi et al.; "Beyond secure channels"; Published in: Proceeding STC '07 Proceedings of the 2007 ACM workshop on Scalable trusted computing; pp. 30-40; ACM Digital Library (Year: 2007).*

Wikipedia, "Diffie-Hellman Key Exchange", Webpage, accessed Mar. 24, 2017, https://en.wikipedia.org/wiki/Diffie%E2%80%93Hellman_key_exchange.

* cited by examiner

FIG. 4

SECURELY SHARING A TRANSPORT LAYER SECURITY SESSION WITH ONE OR MORE TRUSTED DEVICES

BACKGROUND

Transport Layer Security (TLS) is a cryptographic protocol that enables secure communications over a network. TLS may be used, for example, to provide security for email, instant messaging, and Voice-over-IP (VoIP). A webserver may also use TLS to secure all communications between a website hosted on the webserver and one or more web browsers. TLS may be employed by establishing a TLS session between a client device and a server device in which the client device and the server device securely agree upon the manner in which encrypted messages will be communicated during the TLS session. While a TLS session may be effective in a scenario where the encrypted messages are only intended to be shared between a client device and a server device, a TLS session may not be effective in a scenario in which the encrypted messages are also intended to be shared between one or more additional devices.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for securely sharing a TLS session with a trusted device may be performed, at least in part, by a computing device including at least one processor. The method may include establishing a TLS session between a client device and a server device. The method may also include, after establishment of the TLS session, communicating encrypted messages that are encrypted using encryption keys between the client device and the server device. The method may also include, during the communicating of the encrypted messages, intercepting and decrypting one or more of the encrypted messages at the trusted device using the encryption keys. In this embodiment, the establishing of the TLS session may include negotiating a master secret for the TLS session that is known to both the client device and the server device. The establishing of the TLS session may also include establishing a secure channel between the trusted device and the client device or the server device, the trusted device being communicatively positioned between the client device and the server device. The establishing of the TLS session may further include sending, from the client device or the server device, the master secret to the trusted device over the secure channel. The establishing of the TLS session may also include employing the master secret at the client device, at the server device, and at the trusted device to generate, for the TLS session, the encryption keys.

In some embodiments, either the client device or the server device may be a Man in the Middle (MITM) device acting as the client device or acting as the server device and may be communicatively positioned between the client device and another server device or communicatively positioned between the server device and another client device. In some embodiments, the secure channel may only exist during the establishment of the TLS session. In some embodiments, the secure channel may be a Perfect Forward Secrecy (PFS) channel, and the establishing of the secure channel may be accomplished using a Diffie-Hellman key exchange or using a One Round Trip Time (1-RTT) TLS 1.3 handshake. In some embodiments, the intercepting and the decrypting of the one or more of the encrypted messages at the trusted device may be accomplished without interrupting the communicating of the one or more of the encrypted messages between the client device and the server device and without modifying the one or more of the encrypted messages.

Further, in another embodiment, a computer-implemented method for securely sharing a TLS session with a chain of trusted devices may be performed, at least in part, by a computing device including at least one processor. The method may include establishing a TLS session between a client device and a server device. The method may also include, after establishment of the TLS session, communicating encrypted messages that are encrypted using encryption keys between the client device and the server device. The method may further include, during the communicating of the encrypted messages, intercepting and decrypting one or more of the encrypted messages at one or more of the trusted devices in the chain of trusted devices using the encryption keys. In this embodiment, the establishing of the TLS session may include negotiating a master secret for the TLS session that is known to both the client device and the server device. The establishing of the TLS session may also include establishing a chain of secure channels between the chain of trusted devices and the client device or the server device, with the chain of trusted devices being communicatively positioned between the client device and the server device. The establishing of the TLS session may further include sending, from the client device or the server device, the master secret to the chain of trusted devices over the chain of secure channels. The establishing of the TLS session may also include employing the master secret at the client device, at the server device, and at the chain of trusted devices to generate, for the TLS session, the encryption keys.

In some embodiments, each of the secure channels in the chain of secure channels may be a TLS session-specific channel that only exists during the establishment of the TLS session. In some embodiments, each of the secure channels in the chain of secure channels may be a Perfect Forward Secrecy (PFS) channel, and the establishing of each of the secure channels may be accomplished using a Diffie-Hellman key exchange or using a One Round Trip Time (1-RTT) TLS 1.3 handshake. In some embodiments, the intercepting and the decrypting of the one or more of the encrypted messages at the one or more of the trusted devices in the chain of trusted devices may be accomplished without interrupting the communicating of the one or more of the encrypted messages between the client device and the server device, without modifying the one or more of the encrypted messages, and without re-encrypting the one or more of the encrypted messages.

Further, in some embodiments, one or more non-transitory computer-readable media may include one or more computer-readable instructions that, when executed by one or more processors, cause the one or more processors to perform the method for securely sharing a TLS session with a trusted device or the method for securely sharing a TLS session with a chain of trusted devices.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Some embodiments in this disclosure relate to securely sharing a TLS session with one or more trusted devices.

A TLS session may be effective in a scenario where encrypted messages of the TLS session are only intended to be shared between a client device and a server device, but may be ineffective in a scenario in which the encrypted message session are also intended to be shared between one or more additional devices.

For example, in some situations it may be desirable to employ a trusted device that is communicatively positioned in the network between the client device and the server device, such as a router, to intercept the encrypted messages that are communicated between the client device and the server device during the TLS session, and then inspect the contents of the intercepted messages once decrypted. However, to ensure that encrypted messages are not decrypted by unauthorized devices, a TLS session generally only allows the client device and the server device to have access to a master secret that is used during the TLS session to generate encryption keys that are necessary to decrypt the encrypted messages. Therefore, even trusted devices are not generally able to be employed during a TLS session to inspect encrypted messages that are communicated between the client device and the server device because any encrypted message intercepted by the trusted device cannot, without access to this master secret, generate the encryption key or keys that are necessary to decrypt the encrypted message.

In another example, in some situations it may be desirable for a chain of trusted devices, that are communicatively positioned in the network between the client device and the server device, to intercept encrypted messages that are communicated between the client device and the server device during a TLS session and to inspect the contents of the intercepted messages once decrypted. However, just as in the case of a single trusted device, multiple trusted devices in a chain of trusted devices are not generally able to be employed during a TLS session to inspect encrypted messages because they cannot, without access to the master secret, generate the encryption keys that are necessary to decrypt the encrypted messages.

The embodiments disclosed herein may provide various benefits. In particular, the embodiments disclosed herein may, for example, securely share a TLS session, between a client device and a server device, with one or more trusted devices. In some embodiments, the sharing of a TLS session is accomplished using one or more secure channels that are employed to share a master secret of the TLS session with the one or more trusted devices. This master secret may then be employed at each of the one or more trusted devices to generate one or more encryption keys for the TLS session. Then, during the communicating of the encrypted messages between the client and the server, each of the one or more trusted devices may intercept and decrypt the encrypted messages at the trusted device using the encryption key or keys that were generated at the trusted device. In this manner, the contents of each encrypted message can be decrypted and inspected by the trusted device.

In some embodiments, the secure sharing of a TLS session between a client device and a server device with one or more trusted devices may be accomplished with Perfect Forward Secrecy (PFS), thus accomplishing the sharing of the TLS session in a secure manner. Further, in some embodiments, during the establishment of a TLS session, the number of operations performed per trusted device may be bounded regardless of the number of trusted devices with which the master key is shared, thus accomplishing the sharing of the TLS session in a scalable manner. Also, in some embodiments, the intercepting and decrypting of encrypted messages by one or more trusted devices during the secure sharing of a TLS session may be accomplished without the knowledge of the client device or the server device, without modifying the encrypted messages, and without interrupting the communicating of the encrypted messages between the client device and the server device, thus accomplishing the sharing of the TLS session in a nonintrusive manner. Also, in some embodiments, the intercepting and decrypting of encrypted messages by one or more trusted devices during the secure sharing of a TLS session may be accomplished without re-encrypting the encrypted messages, thus accomplishing the sharing of the TLS session in an efficient manner.

Figure 1:
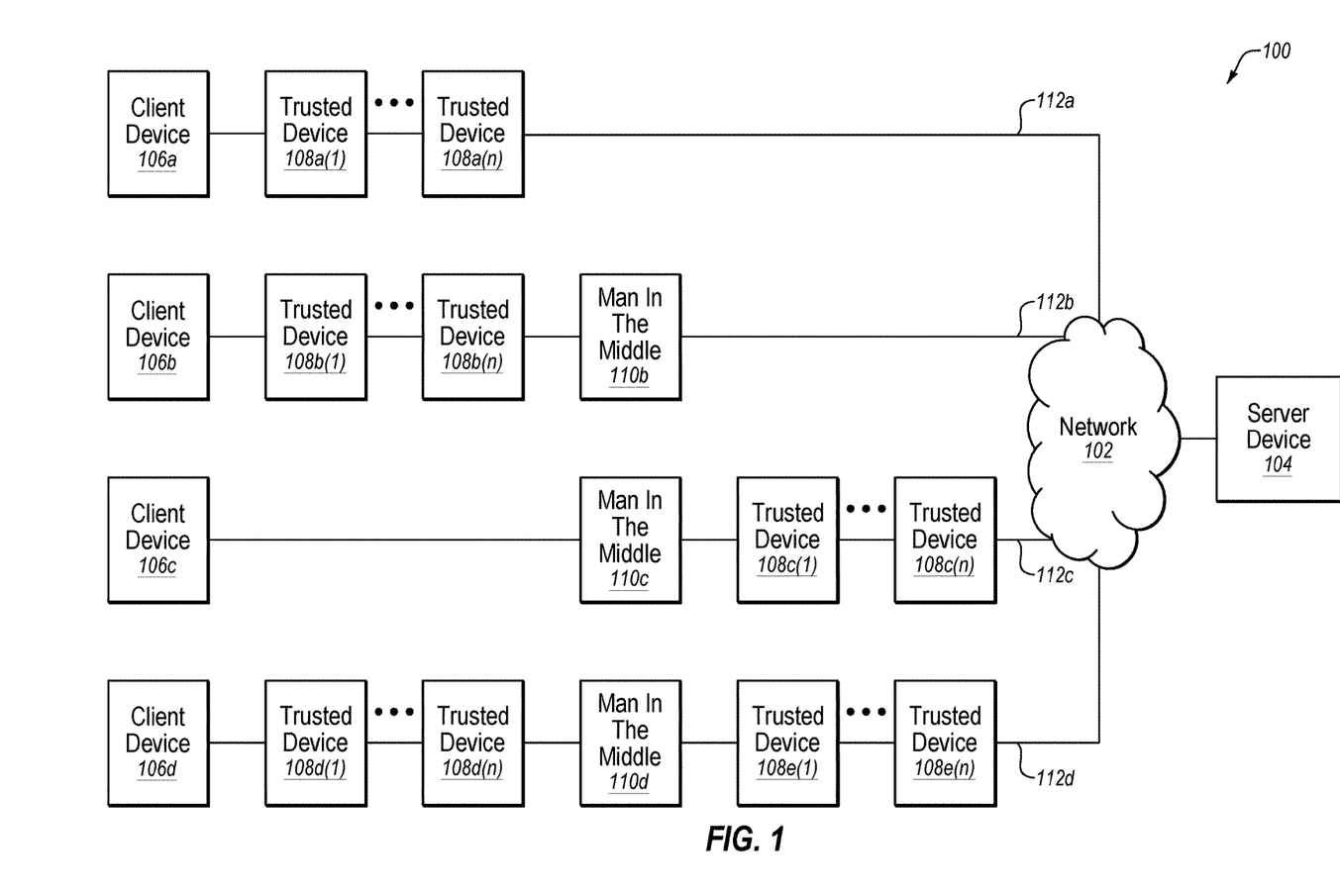
FIG. 1 illustrates an example system configured to securely share a TLS session with one or more trusted devices.

Turning to the figures, FIG. 1 illustrates an example system configured to securely share a TLS session with one or more trusted devices. The system 100 may include a network 102, a server device 104, client devices 106a-106d, trusted devices 108a(1)-108a(n), 108b(1)-108b(n), 108c(1)-108c(n), 108d(1)-108d(n), and 108e(1)-108e(n), and Man in the Middle (MITM) devices 110b-110d.

In some embodiments, the network 102 may be configured to communicatively couple the client devices 106a-106d and the server device 104. In some embodiments, the network 102 may be any wired or wireless network, or combination of multiple networks, configured to send and receive communications between systems and devices. In some embodiments, the network 102 may include a Personal Area Network (PAN), Local Area Network (LAN), Metropolitan Area Network (MAN), a Wide Area Network (WAN), or a Storage Area Network (SAN). In some embodiments, the network 102 may also be coupled to, or may include, portions of a telecommunications network, including telephone lines, for sending data in a variety of different communication protocols, such as a cellular network or a Voice over IP (VoIP) network.

In some embodiments, the server device 104 may be any computer system capable of functioning as a server. In some embodiments, the server device 104 may be configured to facilitate communication sessions between the client devices 106a-106d and other similar devices. For example, the server device 104 may operate as a web server and host a website that can be accessed using web browsers on the client devices 106a-106d. In another example, the server device 104 may operate as an exchange configured to establish communication sessions, such as telephone calls, video calls, and data sharing sessions between devices such as the client devices 106a-106d and another device or devices, among other operations. In some embodiments, the server device 104 may be configured to establish a TLS session with any of the client devices 106a-106d.

In some embodiments, each of the client devices 106a-106d may be any computer system capable of functioning as a client. In some embodiments, each of the client devices 106a-106d may be configured to establish separate TLS sessions with the server device 104.

In some embodiments, each of the trusted devices of FIG. 1 may be any computer system capable of functioning as a trusted device. In some embodiments, each of the trusted devices may be configured to securely share a TLS session between the server device 104 and the client device 106a. As disclosed in FIG. 1, each of the trusted devices is communicatively positioned on one of the paths 112a-112d between the server device 104 and one of the client devices 106a-106d. Further, the ellipsis (" . . . ") illustrated between the index (1) and the index (n) of the trusted devices in FIG. 1 indicates that one or more trusted devices may be employed on each of the paths 112a-112d between the server device 104 and each of the client devices 106a-106d.

In some embodiments, each of the MITM devices 110b-110d may be a computer system capable of functioning as an MITM device. In some embodiments, an MITM device may be any device configured to act as both a client device and a server device and communicatively positioned "in the middle" between a client device and a server device. In some embodiments, each of the MITM devices 110b-110d may be configured to act as a server device in a TLS session between the MITM device and one of the client devices 106b-106d, as well as being configured to act as a client device in another TLS session between the MITM device and the server device 104. Therefore, where one of the MITM devices 110b-110d is involved in communicating encrypted messages between one of the client devices 106b-106d and the server device 104, the MITM device may actually be involved in separate first and second TLS sessions, with each of the encrypted messages from the first TLS session being decrypted at the MITM device and then encrypted in the second TLS session, and vice-versa.

As disclosed in FIG. 1, some embodiments of securely sharing a TLS session with one or more trusted devices may be employed: (1) in a path between a client device and a server device with one or more trusted devices communicatively positioned therebetween, as in the path 112a; (2) in a path between a client device and an MITM device, acting as a server device, with one or more trusted devices communicatively positioned therebetween, as in the path 112b; (3) in a path between an MITM device, acting as a client device, and a server device with one or more trusted devices communicatively positioned therebetween, as in the path 112c; or (4) in a path between a client device and an MITM device, acting as a server device, with one or more trusted devices communicatively positioned therebetween, and also in a path between the same MITM device, acting as a client device, and a server device with one or more additional trusted devices communicatively positioned therebetween, as in the path 112d. Therefore, in some embodiments, the trusted devices of FIG. 1 may securely share a TLS session between a client device (or an MITM device acting as a client device) and a server device (or an MITM device acting as a server device), and may do so with Perfect Forward Secrecy (PFS), with the number of operations performed per trusted device being bounded regardless of the number of trusted devices with which the master key is shared, and with the intercepting and decrypting of encrypted messages being accomplished without the knowledge of the client device or the server device, without modifying the encrypted messages, without interrupting the communicating of the encrypted messages between the client device and the server device, and/or without re-encrypting the encrypted messages.

Modifications, additions, or omissions may be made to the system 100 without departing from the scope of the present disclosure. For example, in some embodiments, only a single trusted device may be communicatively positioned between a client device and a server device. Further, in some embodiments, the system 100 may include additional devices similar to the devices illustrated in FIG. 1 that each may be configured similarly to the devices illustrated in FIG. 1.

Figure 2:
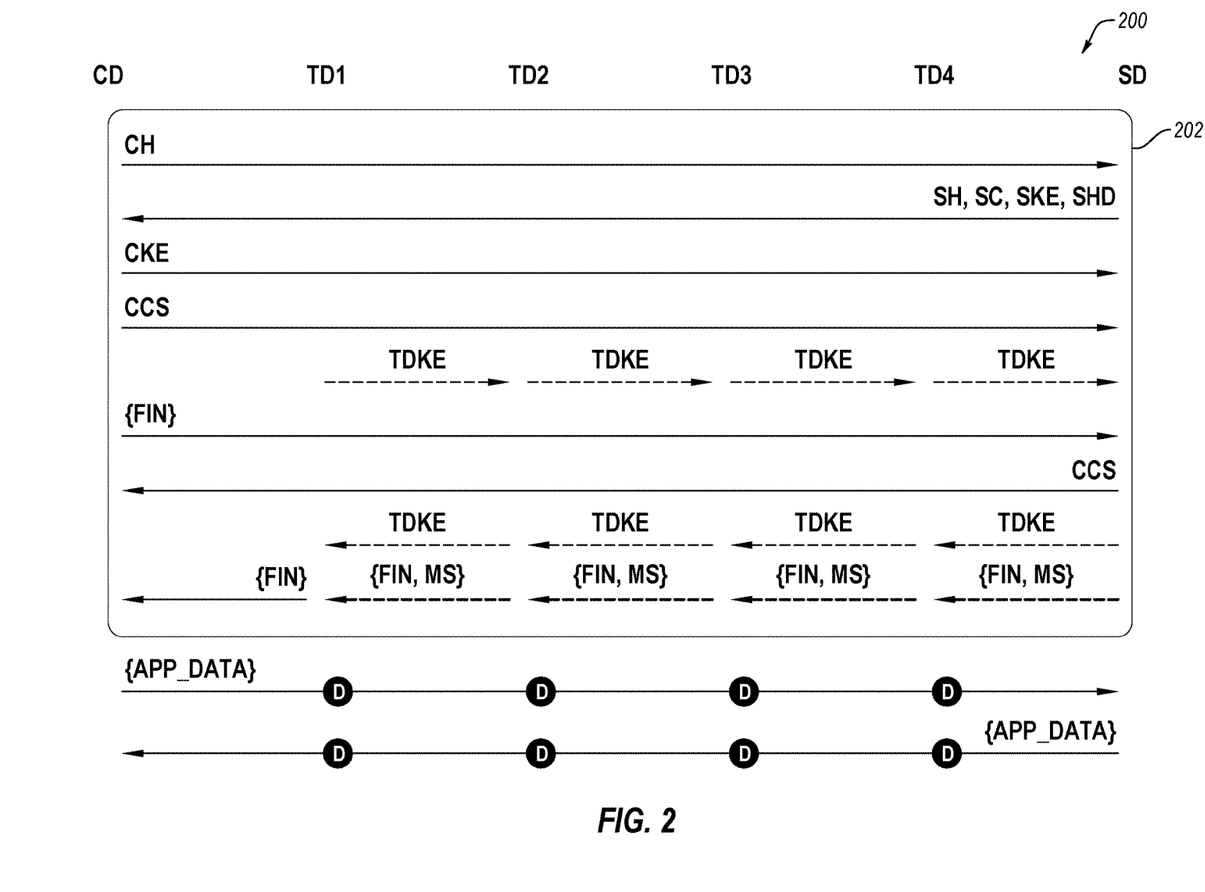
FIG. 2 is a flowchart of an example TLS session.

FIG. 2 is a flowchart of an example TLS session 200. The TLS session 200 may enable secure communication between a client device CD and a server device SD and may also be securely shared with four trusted devices TD1-TD4, arranged similarly to the client device 106a, the server device 104, and the trusted devices 108a(1)-108a(n) in the path 112a of FIG. 1.

In some embodiments, the TLS session 200 may first be established in a series of establishment communications 202. During the establishment communications 202, a master secret for the TLS session that is known to both the client device CD and the server device SD may be negotiated, secure channels between the trusted devices TD1-TD3 and between the trusted device TD4 and the server device SD may be established, the master secret may be sent to each of the trusted devices TD4-TD1 over the secure channels, and the master secret may be employed at the client device CD, at the server device SD, and at each of the trusted devices TD4-TD1 to generate, for the TLS session 200, encryption keys.

The establishment communications 202 may include some initial handshaking messages between the client device CD and the server device SD, including: (1) a Client Hello (CH) message sent from the client device CD to the server device SD, (2) a Server Hello (SH) message, a Server Certificate (SC) message, a Server Key Exchange (SKE) message, and a Server Hello Done (SHD) message sent from the server device SD to the client device CD, (3) a Client Key Exchange (CKE) message sent from the client device CD to the server device SD, and (4) a Change Cipher Spec (CCS) message sent from the client device CD to the server device SD.

Next, the establishment communications 202 may include some messages that are employed to begin establishing secure channels between the trusted devices TD1-TD3 and between the trusted device TD4 and the server device SD, including: (1) a Trusted Device Key Exchange (TDKE) message sent from the trusted device TD1 to the trusted device TD2, (2) a TDKE message sent from the trusted device TD2 to the trusted device TD3, (3) a TDKE message sent from the trusted device TD3 to the trusted device TD4, and (4) a TDKE message sent from the trusted device TD4 to the server device SD.

Next, the establishment communications 202 may include a Finish (FIN) message sent from the client device CD to the server device SD. Then, the establishment communications 202 may include some additional messages that are employed to finish establishing the secure channels between the trusted devices TD1-TD3 and between the trusted device TD4 and the server device SD, including: (1) a TDKE message sent from the server device SD to the trusted device TD4, (2) a TDKE message sent from the trusted device TD4 to the trusted device TD3, (3) a TDKE message sent from the trusted device TD3 to the trusted device TD2, and (4) a TDKE message sent from the trusted device TD2 to the trusted device TD1. After these four messages are sent, four secure channels may have been established, as represented by the bolded arrows in FIG. 2. Four additional messages may then be sent over these four secure channels, including: (1) a FIN message and Master Secret (MS) message sent from the server device SD to the trusted device TD4, (2) a FIN message and MS message sent from the trusted device TD4 to the trusted device TD3, (3) a FIN message and MS message sent from the trusted device TD3 to the trusted device TD2, and (4) a FIN message and MS message sent from the trusted device TD2 to the trusted device TD1. Finally, the establishment communications 202 may conclude with a FIN message sent from the trusted device TD1 to the client device CD. In some embodiments, these five FIN messages and MS messages may each be encrypted and decrypted along the way using secrets derived from the five TDKE messages, respectively, which may enable any modification to the FIN message by an attacker to be detected at any of the trusted devices TD4-TD1 and at the client device CD.

By the conclusion of the establishment communications 202, the master secret for the TLS session 200 may have been securely shared with each of the client device CD, the server device SD, and the trusted devices TD4-TD1, and each of these devices may have used the master secret to generate an encryption key or keys for the TLS session 200. These encryption keys may then be used by the client device CD and the server device SD to encrypt and decrypt messages, and may be used by each of the trusted devices TD1-TD4 to decrypt these encrypted messages for any purpose, such as inspection of the message.

For example, in some embodiments, the TLS session 200 may continue, with one or more iterations, of the client device CD encrypting a message (APP_DATA) and sending the encrypting APP_DATA message to the server device SD, as well as one or more iterations of the server device SD encrypting an APP_DATA message and sending the encrypted APP_DATA message to the client device CD. In either scenario, as the encrypted APP_DATA message is communicated between the client device CD and the server device SD, each of the trusted devices TD1-TD4 may individually intercept and decrypt the encrypted APP_DATA message using the encryption key or keys stored at the trusted device, as indicated by the circled "D" at each of the trusted devices TD1-TD4 in FIG. 2. In some embodiments, each interception and decryption may be accomplished without the knowledge of the client device CD or the server device SD (although in FIG. 2 the server device SD may be aware of the possibility of such a decryption), without modifying the encrypted APP_DATA message, without interrupting the communicating of the encrypted APP_DATA message between the client device CD and the server device SD, and without re-encrypting the encrypted APP_DATA message.

Modifications, additions, or omissions may be made to the TLS session 200 without departing from the scope of the present disclosure. For example, in some embodiments, less than four or more than four trusted devices may be communicatively positioned between the client device CD and the server device SD. Further, in some embodiments, the secure channel established between the trusted device TD4 and the server device SD may instead be established between the client device CD and the trusted device TD1. Also, in some embodiments, the client device CD may actually be an MITM device acting as a client device and/or the server device SD may actually be an MITM device acting as a server device.

Figure 3:
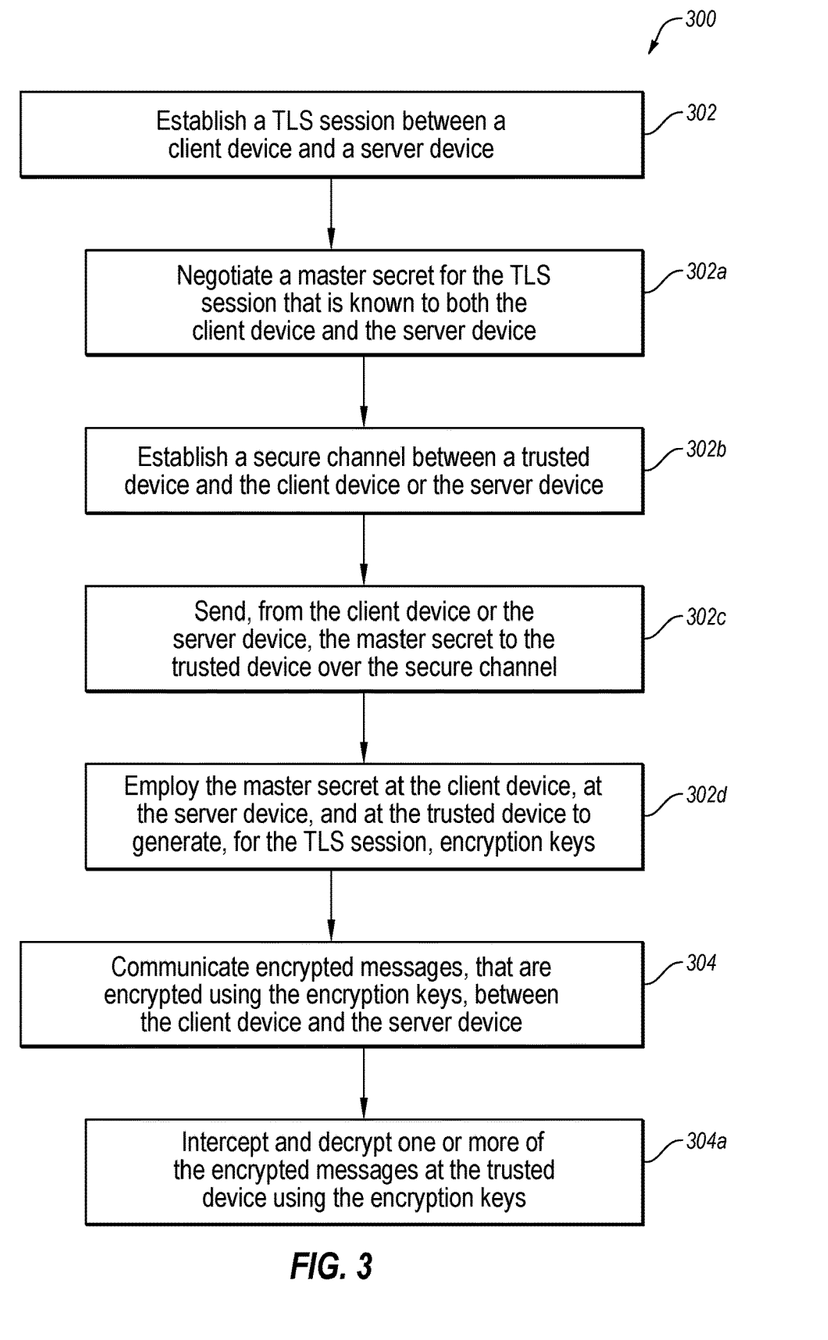
FIG. 3 is a flowchart of an example method for securely sharing a TLS session with one or more trusted devices.

FIG. 3 is a flowchart of an example method 300 for securely sharing a TLS session with one or more trusted devices. The method 300 may be performed, in some embodiments, by a device or system, such as by the client devices, the server devices, and the trusted devices of FIGS. 1 and 2. In these and other embodiments, the method 300 may be performed by one or more processors based on one or more computer-readable instructions stored on one or more non-transitory computer-readable media. The method 300 will now be described in connection with FIGS. 1, 2, and 3.

At block 302, a TLS session may be established between a client device and a server device. For example, the TLS session 200 of FIG. 2 may be established, at block 302, between the client device CD and the server device SD by employing the series of establishment communications 202, or other similar communications. Further, in some embodiments, either the client device or the server device may be an MITM device acting as the client device or acting as the server device and may be communicatively positioned between the client device and another server device or communicatively positioned between the server device and another client device. For example, a TLS session may be established, at block 302, with the MITM device 110d of FIG. 1 acting as a client device or acting as the server device. In some embodiments, the block 302 may include one or more of blocks 302a-302d.

At block 302a, a master secret for the TLS session may be negotiated that is known to both the client device and the server device. For example, during the series of establishment communications 202 of FIG. 2, a master secret for the TLS session 200 may be negotiated that is known to both the client device CD and the server device SD.

At block 302b, a secure channel may be established between a trusted device and the client device or the server device. In some embodiments, block 302a may further include establishing a chain of secure channels between a chain of trusted devices and the client device or the server device. In either case, the trusted device or the chain of trusted devices may be communicatively positioned between the client device and the server device. For example, during the series of establishment communications 202 of FIG. 2, a chain of secure channels may be established between the trusted devices TD1-TD3 and between the trusted device TD4 and the server device SD.

In some embodiments, the secure channel or chain of secure channels may only exist during the establishment of the TLS session, the secure channel or chain of secure channels may have Perfect Forward Secrecy (PFS), and/or the establishing of the secure channel or chain of secure channels may be accomplished using a Diffie-Hellman key exchange channel or a One Round Trip Time (1-RTT) TLS 1.3 handshake. For example, the secure channels that are represented by the bolded arrows in FIG. 2 may be discarded at the conclusion of the establishment communications 202 of FIG. 2, may have PFS, and may be established using a Diffie-Hellman key exchange channel or a One Round Trip Time (1-RTT) TLS 1.3 handshake.

At block 302c, the master secret may be sent to the trusted device over the secure channel from the client device or the server device. In some embodiments, block 302c may further include sending the master secret to the chain of trusted devices over the chain of secure channels from the client device or the server device. For example, during the series of establishment communications 202 of FIG. 2, the master secret may be sent from the server device SD to the trusted device TD4, from the trusted device TD4 to the trusted device TD3, from the trusted device TD3 to the trusted device TD2, and then from the trusted device TD2 to the trusted device TD1 in a Master Secret (MS) message.

At block 302d, the master secret may be employed at the client device, at the server device, and at the trusted device to generate, for the TLS session, encryption keys. In some embodiments, the block 302d may further include employing the master secret at the chain of trusted devices to generate, for the TLS session, encryption keys. For example, during the series of establishment communications 202 of FIG. 2, the master secret MS may, at block 302d, be employed at the client device CD, at the server device SD, and at the trusted devices TD1-TD4 to generate, for the TLS session 200, one or more encryption keys at each of these devices.

At block 304, encrypted messages, that are encrypted using the encryption keys, may be communicated between the client device and the server device. For example, encrypted APP_DATA messages of FIG. 2, that are encrypted using the encryption key or keys that were generated at the client device CD or at the server device at block 302d, may be communicated, at block 304, between the client device CD and the server device SD. In some embodiments, the block 304 may include block 304a.

At block 304a, one or more of the encrypted messages may be intercepted and decrypted at the trusted device using the encryption keys. In some embodiments, block 304a may further include intercepting and decrypting one or more of the encrypted messages at one or more of the trusted devices in the chain of trusted devices using the encryption keys. For example, one or more of the encrypted APP_DATA messages of FIG. 2 may be intercepted and decrypted, at block 304a, by one or more of the trusted devices TD1-TD4 using the encryption key or keys that were generated at each of the trusted devices TD1-TD4 at block 302d. In some embodiments, a given encrypted APP_DATA message need not be intercepted by every one of the trusted devices TD1-TD4, or any of the trusted devices TD1-TD4, and therefore each one of the trusted devices TD1-TD4 can selectively intercept and decrypt encrypted APP_DATA messages as frequently or as infrequently as each of the trusted devices TD1-TD4 desires.

In some embodiments, the intercepting and decrypting of encrypted messages may be accomplished without the knowledge of the client device or the server device, without modifying the encrypted messages, without interrupting the communicating of the encrypted messages between the client device and the server device, and/or without re-encrypting the encrypted messages. For example, during the TLS session 200 of FIG. 2, each of the trusted devices TD1-TD4 may intercept and decrypt the encrypted APP_DATA message without the knowledge of the client device CD or the server device SD, without modifying the encrypted APP_DATA messages, without interrupting the communicating of the encrypted APP_DATA messages between the client device CD and the server device SD, and/or without re-encrypting the encrypted APP_DATA messages.

Although the blocks of the method 300 are illustrated in FIG. 3 as discrete blocks, various blocks may be divided into additional blocks, combined into fewer blocks, reordered, expanded, or eliminated, depending on the desired implementation.

Further, it is understood that the method 300 may improve the functioning of a client device, a server device, or a trusted device in a TLS session. For example, the functioning of the client device CD, the server device SD, or any of the trusted devices TD1-TD4 of FIG. 2 may itself be improved by the method 300. For example, the functioning of the client device CD and/or the server device SD may be improved because encrypted APP_DATA messages that were previously inaccessible to other devices may now be securely intercepted, decrypted, and inspected by any of the trusted devices TD1-TD4 to, for example, detect and correct errors in the client device CD and/or the server device SD during the TLS session 200. In this manner, the encrypted APP_DATA messages may remain securely inaccessible to untrusted devices but also be securely accessible by the trusted devices TD1-TD4, unlike conventional TLS session configurations in which only the client device and the server device are able to securely access encrypted messages.

Also, the method 300 may improve the technical field of secure network communications at least because conventional TLS session configurations do not allow any devices outside of the client device and the server device to access encrypted messages communicated during the TLS session. The ability of the trusted devices disclosed herein to intercept encrypted messages and securely decrypt those messages may allow for secure inspection of the decrypted messages to detect errors and other problems in the TLS session that can then be corrected.

Figure 4:
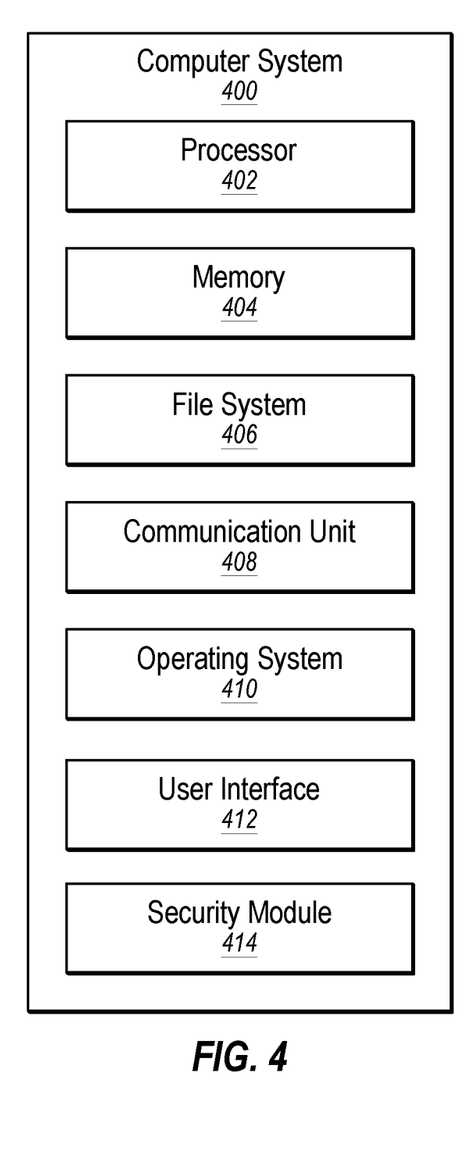
FIG. 4 illustrates an example computer system that may be employed in securely sharing a TLS session with one or more trusted devices.

FIG. 4 illustrates an example computer system 400 that may be employed in securely sharing a TLS session with one or more trusted devices. In some embodiments, the computer system 400 may be part of any of the systems or devices described in this disclosure. For example, the computer system 400 may be part of any of the client devices, the server devices, or the trusted devices of FIGS. 1 and 2.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 securely sharing a TLS session with one or more trusted devices.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform a method for securely sharing a TLS session with one or more trusted devices, such as one or more of the blocks of the method 300 of FIG. 3. In some embodiments, the security module 414 may be part of the operating system 410 or may be part of an application of the computer system 400, or may be some combination thereof.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for securely sharing a Transport Layer Security (TLS) session with a chain of trusted devices, the method comprising:
   establishing a TLS session between a client device and a server device, the establishing of the TLS session comprising:
      negotiating a master secret for the TLS session that is known to both the client device and the server device,
      establishing a chain of secure channels between a chain of trusted devices and the client device or the server device, the chain of trusted devices being communicatively positioned between the client device and the server device,
      sending, from the client device or the server device, the master secret to the chain of trusted devices over the chain of secure channels, and
      employing the master secret at the client device, at the server device, and at the chain of trusted devices to generate, for the TLS session, encryption keys;
   after establishment of the TLS session, communicating encrypted messages, that are encrypted using the encryption keys, between the client device and the server device; and
   during the communicating of the encrypted messages, intercepting and decrypting one or more of the encrypted messages at one or more of the trusted devices in the chain of trusted devices using the encryption keys.

2. The method of claim 1, wherein either the client device or the server device is a Man in the Middle (MITM) device acting as the client device or acting as the server device and is communicatively positioned between the client device and another server device or communicatively positioned between the server device and another client device.

3. The method of claim 1, wherein each of the secure channels in the chain of secure channels is a TLS session-specific channel that only exists during the establishment of the TLS session.

4. The method of claim 3, wherein each of the secure channels in the chain of secure channels is a Perfect Forward Secrecy (PFS) channel.

5. The method of claim 4, wherein the establishing of each of the secure channels in the chain of secure channels is accomplished using a Diffie-Hellman key exchange.

6. The method of claim 4, wherein the establishing of each of the secure channels in the chain of secure channels is accomplished using a One Round Trip Time (1-RTT) TLS 1.3 handshake.

7. The method of claim 1, wherein the intercepting and the decrypting of the one or more of the encrypted messages at the one or more of the trusted devices in the chain of trusted devices is accomplished without interrupting the communicating of the one or more of the encrypted messages between the client device and the server device, without modifying the one or more of the encrypted messages, and without re-encrypting the one or more of the encrypted messages.

8. One or more non-transitory computer-readable media comprising one or more computer-readable instructions that, when executed by one or more processors of one or more computing devices, cause the one or more computing devices to:
   establish a Transport Layer Security (TLS) session between a client device and a server device, the establishing of the TLS session comprising:
      negotiating a master secret for the TLS session that is known to both the client device and the server device,
      establishing a chain of secure channels between a chain of trusted devices and the client device or the server device, the chain of trusted devices being communicatively positioned between the client device and the server device,
      sending, from the client device or the server device, the master secret to the chain of trusted devices over the chain of secure channels, and
      employing the master secret at the client device, at the server device, and at the chain of trusted devices to generate, for the TLS session, encryption keys;
   after establishment of the TLS session, communicate encrypted messages, that are encrypted using the encryption keys, between the client device and the server device; and during the communicating of the encrypted messages, intercept and decrypt one or more of the encrypted messages at one or more of the trusted devices in the chain of trusted devices using the encryption keys.

9. The one or more non-transitory computer-readable media of claim 8, wherein either the client device or the server device is a Man in the Middle (MITM) device acting as the client device or acting as the server device and is communicatively positioned between the client device and another server device or communicatively positioned between the server device and another client device.

10. The one or more non-transitory computer-readable media of claim 8, wherein each of the secure channels in the chain of secure channels is a TLS session-specific channel that only exists during the establishment of the TLS session.

11. The one or more non-transitory computer-readable media of claim 10, wherein each of the secure channels in the chain of secure channels is a Perfect Forward Secrecy (PFS) channel.

12. The one or more non-transitory computer-readable media of claim 11, wherein the establishing of each of the secure channels in the chain of secure channels is accomplished using a Diffie-Hellman key exchange or is accomplished using a One Round Trip Time (1-RTT) TLS 1.3 handshake.

13. The one or more non-transitory computer-readable media of claim 8, wherein the intercepting and the decrypting of the one or more of the encrypted messages at the one or more of the trusted devices in the chain of trusted devices is accomplished without interrupting the communicating of the one or more of the encrypted messages between the client device and the server device, without modifying the one or more of the encrypted messages, and without re-encrypting the one or more of the encrypted messages.

\* \* \* \* \*